United States Patent [19]

Kobayashi et al.

[11] Patent Number: 5,209,656
[45] Date of Patent: May 11, 1993

[54] COMBUSTION SYSTEM FOR HIGH VELOCITY GAS INJECTION

[75] Inventors: Hisashi Kobayashi, Putnam Valley; Arthur W. Francis, Jr., Monroe, both of N.Y.

[73] Assignee: Praxair Technology, Inc., Danbury, Conn.

[21] Appl. No.: 751,967

[22] Filed: Aug. 29, 1991

[51] Int. Cl.⁵ ............................................. F23C 7/02
[52] U.S. Cl. ................................. 431/187; 431/159; 431/190; 239/132.5; 239/419.5; 239/424
[58] Field of Search ............... 431/2, 8, 9, 159, 354, 431/350, 181, 186, 187, 190; 239/132.5, 424, 419.5

[56] References Cited

U.S. PATENT DOCUMENTS

| | | | |
|---|---|---|---|
| 2,206,070 | 7/1940 | Andler | 239/132.5 |
| 3,676,060 | 7/1972 | Bedetti | 431/9 X |
| 3,748,087 | 7/1973 | Shular | 431/185 |
| 3,836,315 | 9/1974 | Shular | 431/188 X |
| 4,373,205 | 3/1983 | Anderson | 431/5 |
| 4,541,796 | 9/1985 | Anderson | 431/187 |
| 4,541,798 | 9/1985 | Miller et al. | 431/266 |
| 4,693,680 | 9/1987 | Snyder et al. | 431/10 |
| 4,878,829 | 11/1989 | Anderson | 431/8 |
| 4,892,475 | 1/1990 | Farrenkopf et al. | 431/8 |
| 4,907,961 | 3/1990 | Anderson | 431/8 |
| 4,946,382 | 8/1990 | Kobayashi et al. | 431/8 |
| 4,969,814 | 11/1990 | Ho et al. | 431/8 |
| 4,988,285 | 1/1991 | Delano | 431/5 |
| 5,000,677 | 3/1991 | Lathion et al. | 431/354 X |

FOREIGN PATENT DOCUMENTS

| | | | |
|---|---|---|---|
| 2449986 | 10/1975 | Fed. Rep. of Germany | 431/9 |
| 0779737 | 11/1980 | U.S.S.R. | 431/348 |

*Primary Examiner*—Carl D. Price
*Attorney, Agent, or Firm*—Stanley Ktorides

[57] ABSTRACT

High velocity gas injection system wherein high velocity and low velocity gases are injected into a cavity in a defined relationship such that the low velocity gas forms a protective barrier from combustion zone damage due to the flow dynamics caused by the high velocity gas.

9 Claims, 4 Drawing Sheets

COMBUSTION SYSTEM FOR HIGH VELOCITY GAS INJECTION

TECHNICAL FIELD

This invention relates to the injection of high velocity gas into a combustion zone.

BACKGROUND ART

Recent advances in combustion technology have employed the use of high velocity gas injection into a combustion zone to carry out combustion with reduced nitrogen oxides ($NO_x$) generation. Nozzles with relatively small diameters are employed in order to achieve the high velocities. The high gas velocities cause furnace gases to be aspirated or entrained into the high velocity gas which has a dampening effect on $NO_x$ generation.

A problem with high velocity gas injection into a combustion zone is that the furnace gases, which may comprise particulate matter and condensible vapors, cause the nozzles, which have small openings to begin with, to foul or corrode easily as the furnace gases are aspirated or entrained into the high velocity gas exiting the nozzle. The furnace gases also tend to be quite hot, on the order of 1000° F. or more, which exacerbates the fouling and corrosion problem.

One way of dealing with this problem has been to provide a large amount of water cooling to the nozzle so as to prevent high temperature corrosion or melting. However, a water cooling system is complex to operate and does not address the fouling problem where the furnace atmosphere has a high particulate content. Moreover, water cooling can escalate the corrosion and fouling problems when the furnace atmosphere contains condensible vapors.

Ceramic nozzles have been proposed as a solution to the fouling problem in high velocity gas injection. However, presently available ceramic nozzles are not suitable for industrial scale operations because of corrosion and cracking due to thermal and other stresses.

It is desirable therefore to have a high velocity gas injection system which will enable one to carry out combustion in a combustion zone without generating a high level of $NO_x$ while reducing the fouling experienced with presently available systems.

Accordingly it is an object of this invention to provide a method for injecting high velocity gas into a combustion zone while avoiding the high level of nozzle fouling experienced with the use of presently available methods.

It is another object of this invention to provide a high velocity gas injection apparatus which can inject high velocity gas into a combustion zone without extensive nozzle fouling.

SUMMARY OF THE INVENTION

The above and other objects which will become apparent to one skilled in the art upon a reading of this disclosure are attained by the present invention, one aspect of which is:

A method for injecting high velocity gas into a combustion zone comprising:

(A) providing a cavity having an opening with a diameter D communicating with a combustion zone containing furnace gases;

(B) injecting a main gas stream from a nozzle into the cavity at a point recessed from the opening in a direction toward the opening at a high velocity exceeding 200 feet per second, said recess having a length L such that L/D is not more than 3.0;

(C) injecting protective gas, having a composition substantially the same as that of the main gas, into the cavity at a point further recessed from the opening than the nozzle at a low velocity not more than 100 feet per second and at a flowrate such that the protective gas is within the range of from 10 to 50 percent of the total gas injected into the cavity;

(D) Passing Protective gas around and past the nozzle and entraining protective gas into the main gas stream downstream of the nozzle; and (E) drawing furnace gases from the combustion zone into the cavity and entraining furnace gases into the main gas stream within the cavity but downstream of the nozzle.

Another aspect of the invention comprises:

High velocity gas injection apparatus comprising:

(A) a cavity having an opening with a diameter D communicating with a combustion zone:

(B) a nozzle for injecting high velocity main gas into the cavity toward the opening positioned at a recess from the opening, said recess having a length L such that L/D is not more than 3.0; and (C) means for providing low velocity Protective gas having a composition substantially the same as that of the high velocity main gas into the cavity at a point further recessed from the opening than is the nozzle for flow of protective gas around and past the nozzle.

DETAILED DESCRIPTION

The invention will be described in detail with reference to the Drawings.

Figure 1:
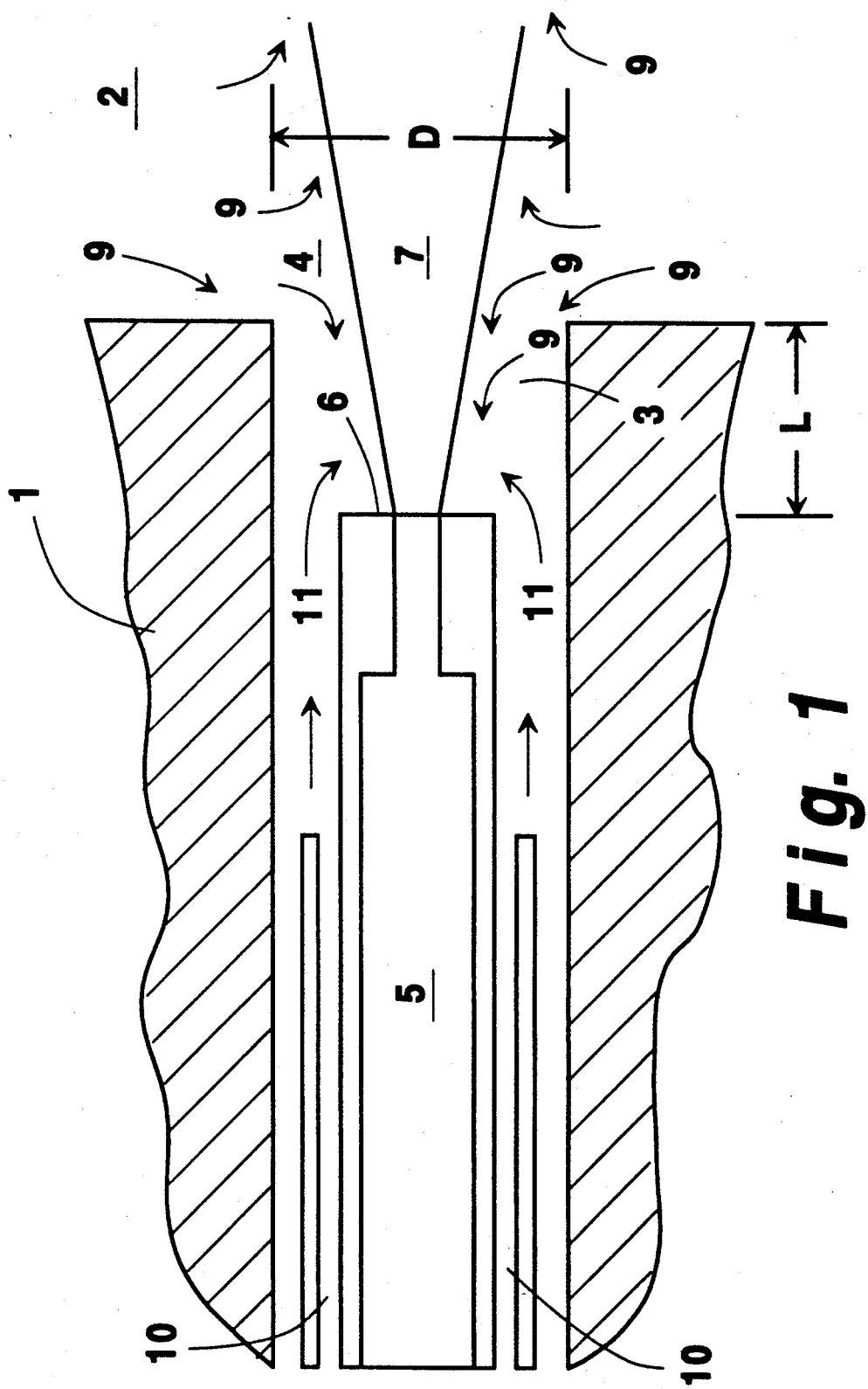
FIG. 1 is a view partly in cross-section of one embodiment of the invention wherein the cavity has a cylindrical configuration.

Referring now to FIG. 1, refractory wall 1 borders combustion zone 2 wherein there is contained a furnace atmosphere comprising furnace gases such as, for example, carbon dioxide, water vapor, nitrogen and/or oxygen. The furnace atmosphere is generally at an elevated temperature typically exceeding 1000 degrees F. and usually within the range of from 1500 to 3000 degrees F. The furnace atmosphere may also contain particulate matter, such as glass batch materials or ash from coal combustion, and/or condensible vapors such as sodium species or acid vapors.

Within refractory wall 1 there is provided cavity 3 which communicates with combustion zone 2 at opening 4 which has a diameter D. Generally opening 4 will have a diameter D within the range of from 0.25 to 10 inches. Main gas injection means, such as lance or conduit 5, having a nozzle 6 is positioned within cavity 3 so as to inject a main gas stream or jet 7 from nozzle 6 in a direction toward opening 4 and then into combustion zone 2. Nozzle 6 is recessed from opening 4 by a distance L such that L/D is not more than 3.0. Preferably nozzle 6 is recessed from opening 4 a distance such that L/D is within the range of from 0.5 to 3.0. The recess of nozzle 6 is sufficient to protect nozzle 6 from damage due to the conditions within combustion zone 2 while not being so great as to cause main gas jet 7 to expand into the walls of cavity 3 prior to entering into combustion zone 2 thus eliminating the aspiration or entraining effect required by the invention.

Nozzle 6 has a small diameter, generally less than 0.5 times the diameter D of opening 4 and usually within the range of from 0.05 to 0.5 times the diameter D of opening 4. In this way the main gas is injected out nozzle 6 at a high velocity exceeding 200 feet per second and generally within the range of from 200 to 2000 feet per second.

The main gas may be either fuel or oxidant. A fuel may be any gas which contains combustibles which may combust in the combustion zone. Among such fuels one can name natural gas, coke oven gas, propane, hydrogen and methane. Oxidant may be any suitable oxidant such as air, oxygen-enriched air or technically pure oxygen having an oxygen concentration of at least 99.5 percent. The main gas passes into combustion zone 2 wherein it mixes with furnace gases as indicated by arrows 9, and combusts further downstream with either fuel or oxidant, as the case may be, to produce further furnace gases.

The high velocity of the main gas jet causes furnace gases from the combustion zone to aspirate or entrain into main gas jet 7 and to enter into cavity 3 as indicated by arrows 9. In the practice of this invention, significant combustion does not take place within cavity 3 as the furnace gases aspirated into cavity 3 normally do not contain a high concentration of fuel or oxidant. This aspiration or entrainment of furnace gases into the main gas jet has a beneficial effect on $NO_x$ generation by providing added non-reactive mass thus reducing the peak flame temperature. Protective or purge gas, having a composition substantially the same as that of the main gas, is passed into a cavity 3, such as through annular or coaxial passageway or conduit 10, at a point further recessed from opening 4 than is nozzle 6 from where main gas is injected in cavity 3, and at a low velocity not more than 100 feet per second and generally within the range of from 5 to 100, preferably 10 to 50, feet per second. By maintaining the compositions of the main and protective gases substantially the same, recombustion near the nozzle within cavity 3 is substantially prevented. The low velocity of the protective gas relative to the high velocity main gas ensures that the protective gas is drawn from its recessed position around and Past the nozzle and is then entrained into the main gas.

It is an important element of this invention that the protective or purge gas be injected into the cavity at a point further recessed from the opening than the point where the main gas is injected into the cavity. This further recess accomplishes two results. First, it allows the protective gas to flow around the surface of the nozzle thus serving to protect the nozzle from the hot furnace gases which are drawn into the cavity. Second, the further recess protects the protective gas injection means, such as the annular opening shown in the Figures, from becoming fouled due to the action of the furnace gases. The further recess must be sufficient to enable even or uniform distribution of the protective gas around the nozzle.

The protective gas is injected into cavity 3 at a flowrate such that the protective gas is within the range of from 10 to 50 percent, preferably from 10 to 30 percent, of the total gas, i.e. protective gas and main gas, injected into cavity 3. This high flowrate or large amount of protective gas ensures that the protective gas will accomplish the nozzle protection effect or purging function from the incoming furnace gas.

The protective gas flows around the surface and past nozzle 6 as shown by arrows 11. Downstream of nozzle 6 the protective gas is entrained into main gas jet 7 and serves as a gas barrier preventing furnace gases from contacting nozzle 6. Thus furnace gases are entrained into the main gas stream within the cavity but only downstream of the nozzle. The main gas and the protective gas then combine and flow into the combustion zone where they become the fuel or the oxidant, as the case may be, for a combustion reaction which generates heat and furnace gases. Thus plugging or fouling of nozzle 6 is prevented despite its small nozzle diameter even if the furnace atmosphere contains high levels of particulates and/or condensible vapors, such as might be present in a glassmelting vessel. Other applications where the invention may find use include the injection of gases into various high temperature smelting processes, and in waste incineration.

In addition the protective gas simultaneously provides a cooling effect in addition to a physical gas barrier. Thus water cooling of the gas injection means is not required while still avoiding damage to the gas injection means which might be caused by the high temperatures within the combustion zone.

Preferably the high velocity gas injection system of this invention is employed to separately inject both fuel and oxidant into the combustion zone in a single combustion system. Most preferably the fuel and oxidant are injected into the combustion zone each through a plurality of the high velocity gas injection systems of this invention. Generally from 1 to 8 high velocity gas injection systems may be employed in a single combustion system. A furnace or other such facility may employ one or more such combustion systems.

Figure 2:
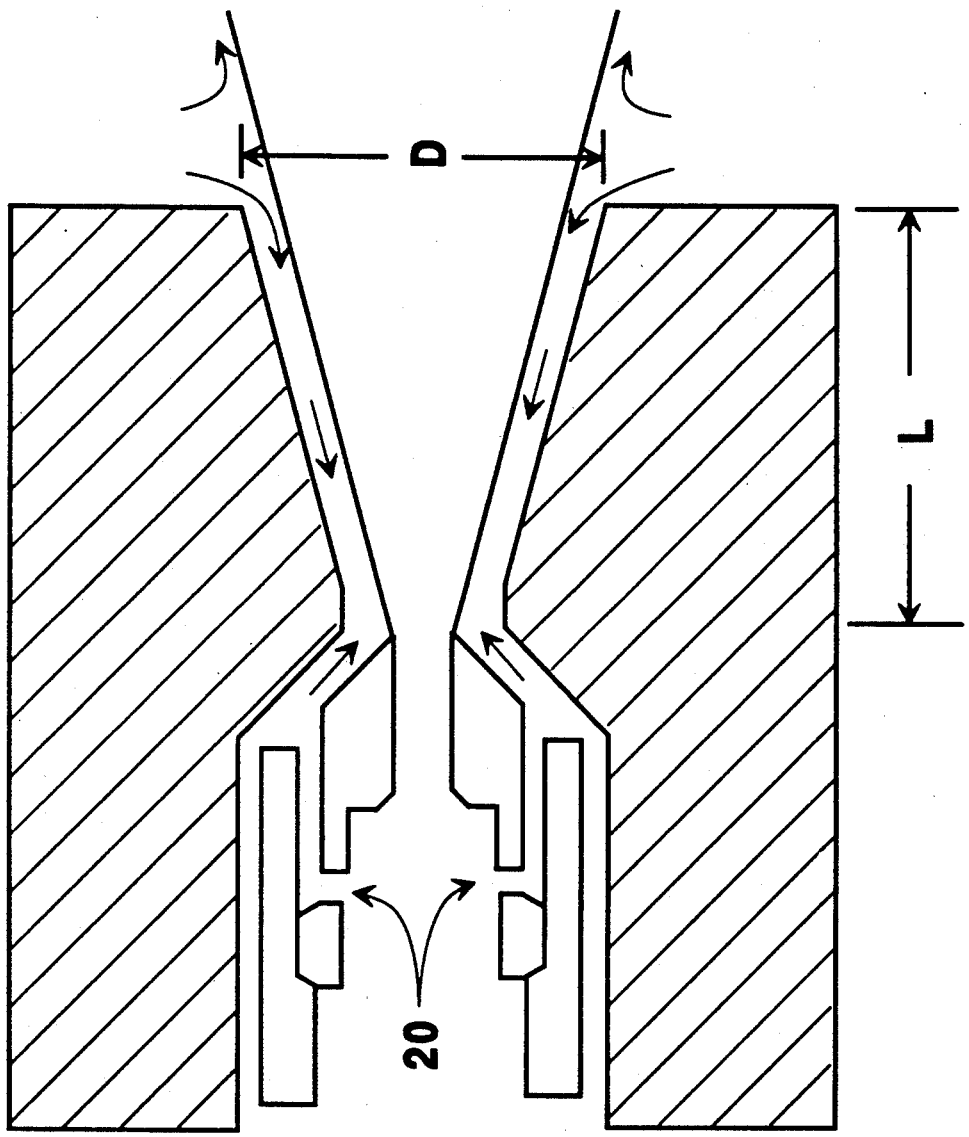
FIG. 2 is a view partly in cross-section of another embodiment of the invention wherein the cavity has a conical configuration.

FIG. 2 illustrates another embodiment of the invention wherein the cavity has a conical configuration. The embodiment illustrated in FIG. 2 employs a bleed 20 which draws gas from the lance and passes it outside of the nozzle to serve as the protective gas. In this way, the main gas and the protective gas are identical. The refractory cavity, the bleed lines and the nozzle are configured in order to attain the requisite low velocity for the Protective gas and the requisite high velocity for the main gas. The remaining operation of the embodiment illustrated in FIG. 2 is substantially the same as that of the embodiment illustrated in FIG. 1 and thus will not be described in detail.

The following examples serve to further illustrate the invention and are not intended to be limiting.

EXAMPLE 1

In a commercial glassmelting furnace a water cooled burner fired with oxygen and natural gas experienced severe fouling due to the condensation of volatile glass batch compounds in the furnace atmosphere.

A combustion system was constructed having one fuel injection or lance system and two oxidant injection or lance systems each similar to the embodiment of the invention illustrated in FIG. 2. The fuel employed was natural gas and the oxidant was technically pure oxygen. For each lance system the conical refractory cavity had a small diameter of about 0.625 inch and a large diameter at the opening of about 1.7 inches. The nozzle had a diameter of about 0.375 inch and was recessed from the opening a distance of about 2 inches. The main gas was injected into the cavity at a velocity of within the range of from 300 to 1000 feet per second and the protective gas flowed at a velocity of less than 100 feet per second. The flowrate of the protective gas was varied to be within the range of from 10 to 30 percent of the total gas flowrate into the cavity. Combustion was carried out within the combustion zone without fouling the nozzles thus solving the previously described fouling problem.

EXAMPLE 2

Figure 3:
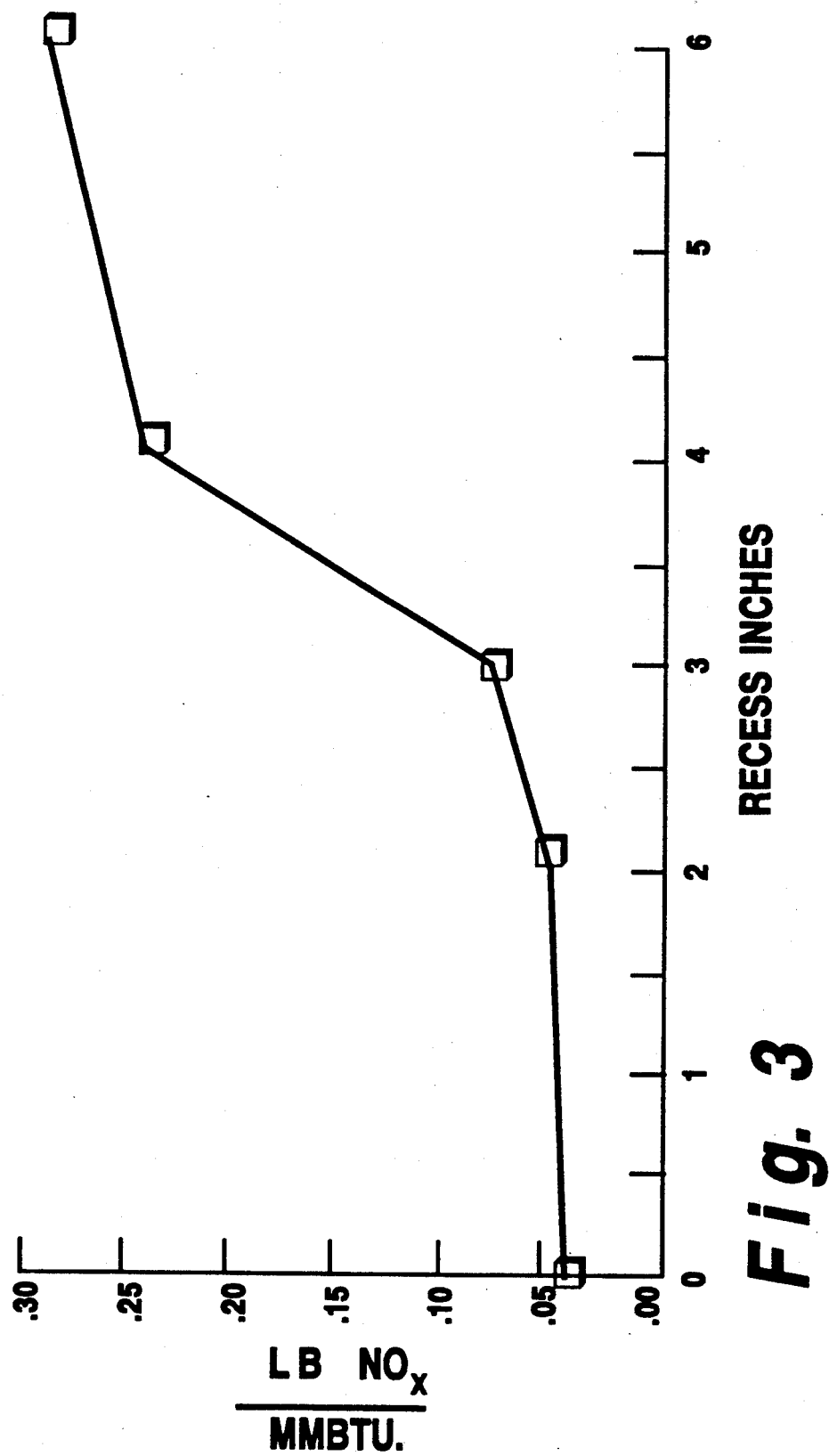
FIG. 3 is a graphical representation of the critical effect of the L/D ratio on $NO_x$ generation.
Figure 4:
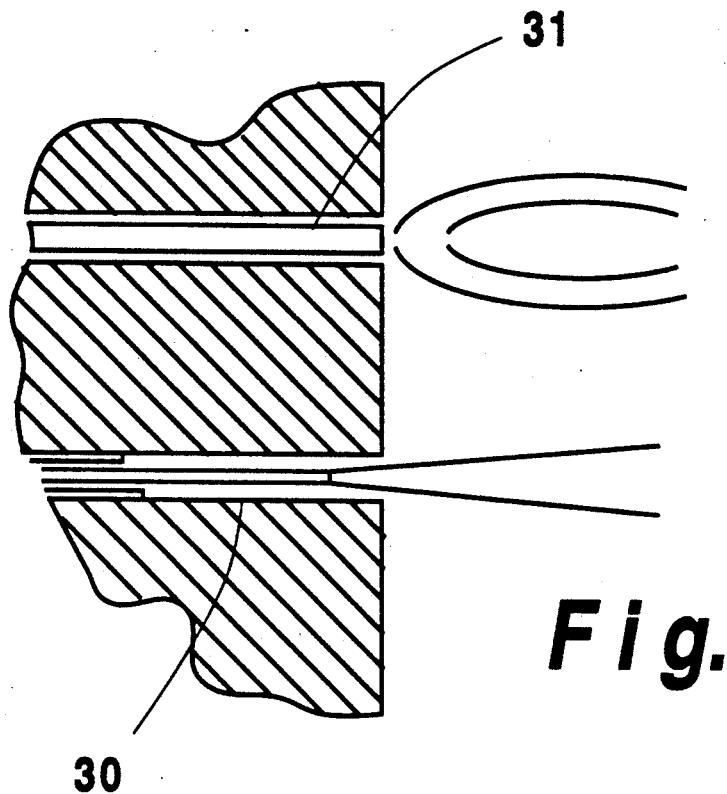
Figure 5:
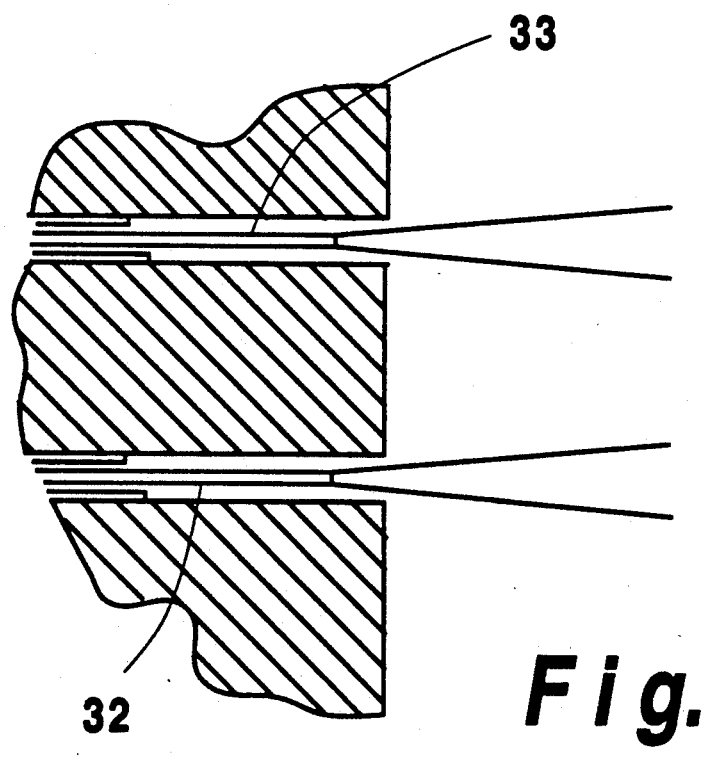

A combustion system was constructed having one fuel injection or lance system and one oxidant injection or lance system of the invention. The fuel employed was natural gas at a flow rate of 762 standard cubic feet per hour (SCFH) and the oxidant was technically pure oxygen at a flowrate of 1470 SCFH. Each system had a cylindrical refractory having a diameter at the opening to the combustion zone of 1.0 inch. The high velocity fuel was injected into the cavity through a nozzle having a diameter of 0.188 inch and at a recess from the opening which was varied between 0 and 6 inches. Combustion was carried out and $NO_x$ generation was measured and is reported in FIG. 3 in pounds of $NO_x$ per million BTU. As can be seen from FIG. 3, at L/D ratios exceeding 3.0 the $NO_x$ generation experiences a very sharp increase. With no recess $NO_x$ generation was low but nozzle fouling due to heat and furnace gases was pronounced.

Now by the use of the invention one can obtain the advantages of high velocity gas injection i.e. high combustion reaction momentum and low $NO_x$ generation, while avoiding nozzle fouling due to heat and furnace gas aspiration. The invention uses the high velocity gas injection to effectively deploy the protective gas so as to protect the nozzle and block the furnace gases from contacting the nozzle. Thus one gets substantially all of the advantages of furnace gas aspiration while avoiding the detrimental effects by a configuration which causes high velocity gas injection to achieve both the aspiration and the protective function.

Although the invention has been described in detail with reference to certain embodiments, those skilled in the art will recognize that there are other embodiments of the invention within the spirit and the scope of the claims.

We claim:
1. A combustion system comprising at least one gas injection means for injecting fuel and at least one gas injection means for injecting oxidant into a combustion zone at least one of said gas injection means comprising:
    (A) a cavity having an opening with a diameter D communicating with the combustion zone;
    (B) a nozzle for injecting high velocity main gas into the cavity toward the opening positioned at a recess from the opening, said recess having a length L such that L/D is not more than 3.0; and
    (C) means for providing low velocity protective gas having a composition substantially the same as that of the high velocity main gas into the cavity at a point further recessed from the opening than is the nozzle, for flow of protective gas around and past the nozzle.
2. The combustion system of claim 1 wherein each of said fuel gas injection means and said oxidant gas injection means comprises the elements of (A), (B) and (C).
3. The apparatus of claim 1 wherein the cavity has a cylindrical configuration.
4. The apparatus of claim 1 wherein the cavity has a conical configuration.
5. The apparatus of claim 1 wherein the opening has a diameter within the range of from 0.25 to 10 inches.
6. The apparatus of claim 1 wherein L/D is within the range of from 0.5 to 3.0.
7. The apparatus of claim 1 wherein the nozzle has a diameter less than 0.5 times the diameter D of the opening.
8. The apparatus of claim 1 further comprising a conduit for supplying main gas to the nozzle wherein the protective gas provision means comprises a conduit coaxial with the main gas conduit terminating upstream of the nozzle.
9. The apparatus of claim 1 further comprising a conduit for supplying main gas to the nozzle wherein the protective gas provision means comprises a bleed line upstream of the nozzle within the main gas conduit communicating with the cavity.

* * * * *